United States Patent [19]

Farr

[11] 4,049,322
[45] Sept. 20, 1977

[54] VEHICLE BRAKING SYSTEMS
[75] Inventor: Glyn Phillip Reginald Farr, Leek Wootton, England
[73] Assignee: Girling Limited, Birmingham, England
[21] Appl. No.: 710,221
[22] Filed: July 30, 1976
[30] Foreign Application Priority Data
Aug. 14, 1975 United Kingdom ............... 33850/75
[51] Int. Cl.² ........................... B60T 8/26; B60T 8/22
[52] U.S. Cl. ................................. 303/6 C; 303/22 R
[58] Field of Search ............... 188/349; 303/6 C, 6 R, 303/22 A, 22 R

[56] References Cited
U.S. PATENT DOCUMENTS 3,501,203  3/1970  Falk .............................. 303/22 A X
3,832,007  8/1974  Thrush .............................. 303/6 C
3,901,561  8/1975  Seip .............................. 303/22 P
3,945,686  3/1976  Orzel .............................. 303/6 C Primary Examiner—Duane A. Reger
Attorney, Agent, or Firm—Scrivener, Parker, Scrivener & Clarke

[57] ABSTRACT

In a pressure reducer valve assembly for a vehicle braking system a valve member co-operates with a valve seat of which opposite sides communicate with an inlet connected to a master cylinder and an outlet for connection to a brake, a pressure responsive member controls the position of the valve member in opposition to a spring urging the valve member away from its seat and the position of an abutment member for the spring is controlled in response to a difference in the pressures in two pressure spaces of a master cylinder which supply independent braking circuits.

8 Claims, 4 Drawing Figures

VEHICLE BRAKING SYSTEMS

SPECIFIC DESCRIPTION

This invention relates to pressure reducer valve assemblies for vehicle braking systems and more particularly to pressure reducer valve assemblies of the kind comprising a housing having an inlet for connection to a pressure space of a master cylinder assembly and an outlet for connection to a brake, a valve member adapted to co-operate with a valve seat of which opposite sides communicate with the inlet and outlet, and a pressure responsive member subject to inlet pressure and controlling the position of the valve member relative to its seat in opposition to resilient means urging the valve member away from its seat, the arrangement being such that for a range of inlet pressures the valve member is held away from the seat by the resilient means and the outlet pressure increases at the same rate as the inlet pressure, but for inlet pressures above a threshold value the inlet pressure acting on the pressure responsive member is sufficient to overcome the force of the resilient means so that the valve member co-operates with the seat and thereafter further increases in inlet pressure are transferred to the outlet at a reduced rate.

In one known reducer valve assembly of the kind set forth the valve seat is located in a fixed position in an end portion of a bore in the housing in which works the pressure responsive member in the form of a plunger. When the valve member co-operates with the valve seat increases in inlet pressure besides acting on the pressure responsive member also act on the valve member tending to move the valve member away from the seat. The valve member then meters increases in fluid pressure to the outlet at a reduced rate.

In another known reducer valve assembly the pressure responsive member comprises a first piston, and the valve seat is located in a second piston of larger cross-sectional area than the first piston operating in tandem with the first piston in a bore in the housing. Such an assembly is described in the Complete Specification of our earlier U.K. Pat. No. 1 215 806.

It is well known to use a pressure reducer valve assembly in a braking circuit in which a pressure space in a master cylinder supplies brakes on both the front and rear wheels of a vehicle. The front wheel brakes are connected directly to the master cylinder whereas the rear wheel brakes are connected through the reducer valve assembly. The pressure reducer valve assembly ensures that an increased proportion of the braking effort is applied to the front wheels of the vehicle during heavy braking than to the rear wheels.

When a dual circuit braking system is used the problem arises that in the event of a failure of one of the systems the distribution of braking effort between the front and rear wheels may change dramatically depending on the arrangement of the circuits, even though one or more reducer valve assemblies is used, such that an undesirably excessive degree of braking is applied to the rear wheels.

A popular braking system which suffers from this problem is one in which one pressure space of a tandem master cylinder is connected to an actuator on each of the front wheels of the vehicle, and the other pressure space is connected to actuators on the front wheels and to actuators on the rear wheels. If the circuit connected to actuators on each of the wheels fails then braking is applied by the other circuit to the front wheels and the vehicle remains stable during braking. However, if the circuit connected only to the front wheels fails the effect is that the proportion of braking force applied to the rear wheels is increased. It is common practice with this braking arrangement for the braking circuit connected to the front wheels only to supply a relatively large percentage of the braking forces during normal braking so that in the event of a failure of the other braking circuit a sufficient braking force can be generated for a given pedal-effort to satisfy legal requirements. Consequently, in the event of a failure of the system connected only to front wheel actuators the change in the distribution of braking forces between the front and rear wheels can be considerable.

If a conventional pressure reducer valve assembly of the kind set forth were to be incorporated in such a system between the master cylinder and the rear wheel actuators it would not take account of a failure of the circuit connected to the front wheel actuators only.

According to one aspect of the invention we provide a pressure reducer valve assembly of the kind set forth suitable for use with a master cylinder assembly having two pressure spaces supplying two independent braking circuits, in which the position of an abutment member for the resilient means is controlled in response to the difference between the pressure in said inlet adapted to be connected to said pressure space of said master cylinder assembly, and the pressure in a second inlet of the valve assembly adapted to be connected to a second pressure space of the master cylinder assembly.

The loading of the resilient means and thus the pressure at which the valve assembly starts to proportion the outlet pressure is altered when the pressure in the second inlet falls owing to failure of the braking circuit connected to that inlet. Thus, in the event of a failure of one braking circuit, the distribution of braking pressures in the remaining brakes between the front and rear wheels may be altered advantageously.

Preferably the abutment member comprises a stepped piston working in a stepped bore and subject at its larger end to the pressure in the second inlet and at its smaller end to the pressure in the first inlet whereby the piston is held against the step in the bore when the pressures in the inlets are substantially the same, but whereby the piston moves away from the step upon failure of the pressure in the second inlet.

The resilient means conveniently comprises a caged compression spring of which the cage at the end of the spring remote from the end which bears on the valve member bears against said abutment member.

When the abutment member is in the position which it occupies when the inlet pressures are substantially equal the compressive force in the spring is taken by the abutment member so that the valve member is biassed away from the valve seat and the reducer valve assembly operates in the conventional manner. However, upon failure of the pressure in the second inlet causing the abutment member to move away from the cage assembly, the force in the spring is taken by the cage so that the spring no longer exerts a force on the valve member. The reducer valve assembly will thus provide a reduced pressure at its outlet for all values of pressure at the first inlet.

The valve assembly may incorporate a member adapted to be connected to a part of the vehicle and responsive to changes in the distribution of load on the vehicle wheels during braking, the member being arranged to change the loading of the resilient means. The resilient means is then conveniently arranged to be a spring external to the valve assembly housing.

According to another aspect of the invention a vehicle hydraulic braking system comprises a tandem master cylinder in which are defined first and second pressure spaces, the first pressure space is connected directly to an actuator on each of a pair of front wheels of the vehicle, and indirectly through a pressure reducer valve assembly to actuators on each of a pair of rear wheels of the vehicle, and the second pressure space is connected directly to further actuators on each of the front wheels, the pressure reducer valve assembly being responsive to the pressure in the first pressure space and arranged such that increases in pressure in the first pressure space up to a threshold value are transmitted by the reducer valve assembly directly to the rear wheel actuators, but for pressures above the threshold value increases in pressure in the first pressure space are transferred to the rear wheel actuators at a reduced rate, and the pressure reducer valve being responsive also to the difference in pressure between the first and second pressure spaces and arranged to reduce the threshold value upon failure of the pressure in the second pressure space.

Preferably the tandem master cylinder is of the kind described in the Provisional Specifications of our co-pending U.K. patent applications Nos. 27205/75 and 32398/75, dated the 27th June, 1975 and the 2nd Aug., 1975 respectively, the first and second pressure spaces referred to above being respectively the primary and secondary pressure spaces defined in those Provisional Specifications. The master cylinder defined in the above specifications is of the kind having a stepped bore with a larger diameter primary piston working in the larger diameter portion of the bore and a smaller diameter secondary piston working in the smaller diameter portion.

Preferably the threshold value is reduced substantially to zero on failure of the pressure in the second pressure space.

A preferred embodiment of the invention will now be described with reference to the accompanying drawings in which.

Figure 1:
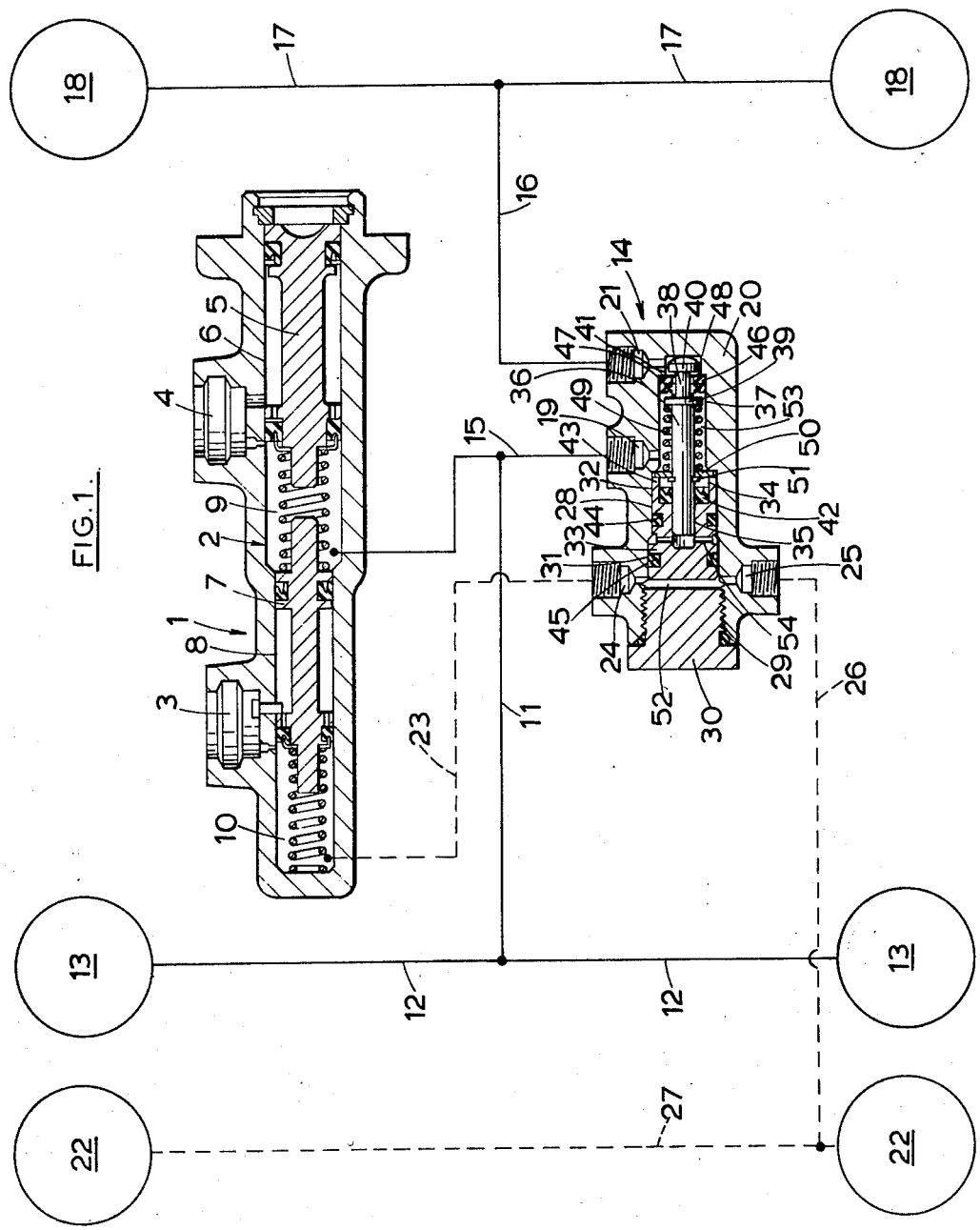
FIG. 1 is a diagrammatic layout of a braking system with a tandem master cylinder and a reducer valve assembly being shown in cross-section.

The tandem master cylinder 1 illustrated in the drawing is provided with a stepped bore 2 and two recuperation ports 3, 4 which are connected to a reservoir for hydraulic fluid. A pedal operated primary piston 5 of larger diameter works in the larger diameter bore portion 6 and a secondary or floating piston 7 of smaller diameter works in the smaller diameter bore portion 8 to control the supply of fluid to primary and secondary pressure spaces 9, 10 of the master cylinder 1, respectively. The construction and operation of the tandem master cylinder 1 is further described in the Provisional Specifications of our co-pending Application Nos. 27205/75 and 32398/75.

The first pressure space 9 of the master cylinder is connected directly by brake lines 11 and 12 to a pair of actuators 13 on opposite front wheels of the vehicle, and indirectly through a reducer valve assembly 14 and brake lines 15, 16 and 17 to a pair of actuators 18 on a pair of rear wheels of the vehicle.

Line 15 is connected to a first inlet 19 in the housing 20 of the valve assembly 14, and line 16 is connected to a first outlet 21 of the housing 20.

The second pressure space 10 of the master cylinder has a direct fluid pressure connection to a further pair of actuators 22 on the front wheels of the vehicles by way of line 23, second inlet 24 and second outlet 25 in the housing 20, and lines 26 and 27.

The construction and operation of valve assembly 14 will now be described. Housing 20 is provided with a blind bore 28 having five bore portions of progressively reducing diameter. The largest diameter bore portion 29 at the open end of the bore is closed by threaded plug 30. In adjacent bore portions 31 and 32 works a stepped piston 33 provided with a stepped blind bore 34 at its inner end. Working in the smaller diameter part 35 of stepped bore 34 is the outer end of a pressure responsive member 36 in the form of a rod. The rod 36 extends into bore portion 37 and is provided at its inner end with a reduced stem 38 backed by a radial flange 39 and carrying an integral valve head 40 which is received in the bore portion 41 of smallest diameter.

A cup seal 42 is an interference fit in the larger diameter bore portion 43 of the stepped piston and provides a seal between the pressure responsive member 36 and stepped piston 33. Further axially spaced seals 44 and 45 seal the stepped piston 33 in the housing bore portions 32 and 31 respectively.

A resilient cup-shaped seating member 46 is held in position at the step in the bore between bore portions 37 and 41 by a compression spring 47 acting between flange 39 and an annular abutment ring 48 in engagement with seating member 46.

A resilient means in the form of a caged compression spring 49 acts between flange 39 and a cage in the form of a washer 50 slidable on rod 36. Washer 50 is backed by a circlip 51 received in an annular groove in rod 36 and controlling the maximum extension of the caged spring 49 by its abutment with washer 50.

The assembly is shown in FIG. 1 with the parts in the positions they occupy when the pressure spaces of the master cylinder are unpressurised. In this condition stepped piston 33 is in abutment with the step at the change in diameter between bore portions 28 and 31 and a chamber 52 is defined between plug 30 and the outer end of piston 33. Chamber 52 is permanently in communication with the second inlet and outlet 24 and 25. Washer 50 abuts the inner end of stepped piston 33 and also abuts circlip 51 so that the valve member 40 is held away from seat 46 and in contact with, or just clear of the closed end of the housing bore. Communication then exists between first inlet 19, chamber 53 in bore portion 37 between the valve seat 48 and stem 38 to the first outlet 21.

If the master cylinder is then actuated and both braking circuits are operational the pressure in the master cylinder pressure spaces 9 and 10 will rise together. The pressures in chambers 52 and 53 will also rise at the same rate. Since piston 33 is stepped it will be held against the step in the bore by the equal pressures acting in the two chambers. The piston 33 then acts as an abutment member for spring 49. As pressure rises in chamber 53 the pressure responsive member 36 is subject to the pressure in chamber 53 acting over the cross-sectional area of its outer end portion and acting towards stepped piston 33. This force is opposed by the force of spring 49.

Figure 2:
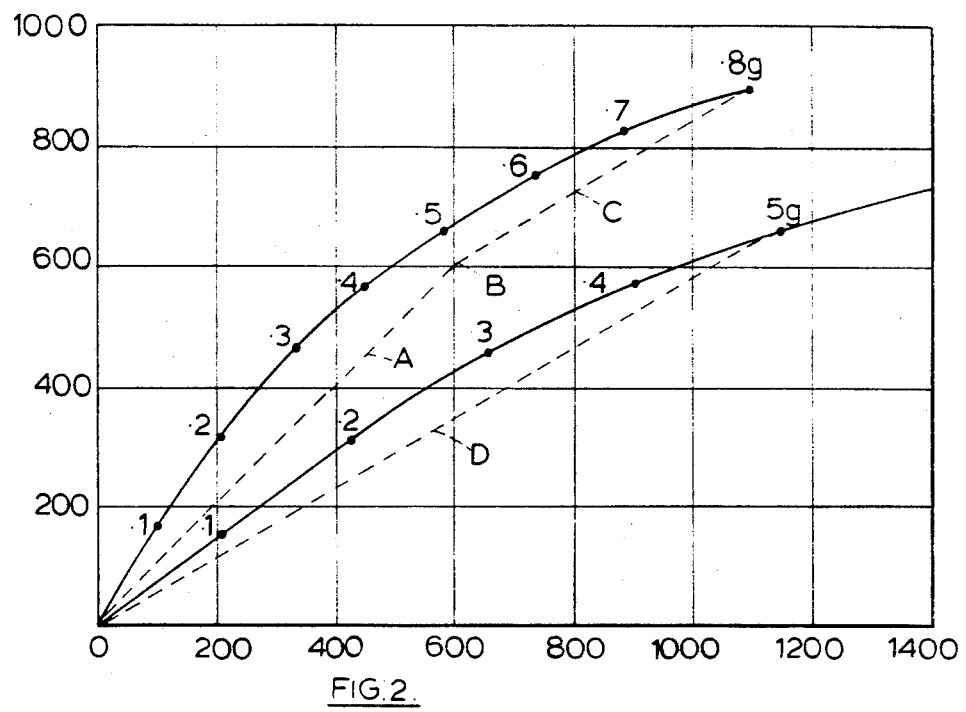
FIG. 2 is a graph showing how the brake pressure in the rear wheel actuators varies in dependence on the pressure in the front wheel actuators of the same circuit.

The initial rise in pressure in the first pressure space 9 is thus directly transmitted to the rear wheel actuators since the valve member 40 is held away from its seat 46 by spring 49. This range of the operation of the assembly is represented by the portion A of the graph of FIG. 2. In FIG. 2 the vertical axis corresponds to the pressure in the rear wheel actuators and the horizontal axis corresponds to the pressure in the front wheel actuators. Thus the full lines represent the ratio between the pressures in the front and rear wheel actuators in an ideal system. The dotted lines represent the same ratio for our system.

When the pressure in chamber 53 reaches a threshold value at which the outward force on pressure responsive member 36 due to fluid pressure is sufficient to overcome the spring force, at point B in the graph, the valve head 40 engages with the seat 46. Thereafter for further increases in pressure, the pressure in chamber 53 is metered at a reduced rate of increase to the rear-wheel actuators in known manner by the co-operation between valve member 40 and seat 46. In brief, once the member 40 has contacted seat 46 the net fluid pressure force acting on member 36 is reduced so that member 36 tends to be lifted momentarily away from seat 46 again under the force of spring 49.

The subsequent rise in pressure in the rearwheel actuators is represented by the portion C of the graph.

Thus when the braking circuit connected to pressure space 10 is operational the valve assembly operates in a conventional manner.

To accommodate for movement of member 36 relative to piston 33 radial passageways 54 in the piston 33 communicate with a vent hole, not shown, in the housing leading to atmosphere.

If, however, the braking circuit connected to pressure space 10 has failed so that the pressure in chamber 52 is zero or does not increase at the same rate as pressure in chamber 55 connected to the first pressure space 9 then stepped piston 33 will be moved away from the step in the bore by the difference in pressures acting on its opposite ends and into abutment with plug 30. Piston 53 then does not act as an abutment for the spring 49. The force of spring 49 is then taken by circlip 41 and thus the spring 49 no longer resiliently biasses valve member 40 relative to its seat.

Thus, on initial rise in pressure in first pressure space 2 and in chamber 53 the pressure responsive member 36 immediately moves outwards so that valve member 40 engages with seating member 46. Thus the threshold value of pressure in pressure space 9 at which the valve closes is reduced substantially to zero by relieving the resilient biassing of the valve member 40. As the pressure in pressure space 9 and in actuators 13, continues to rise, the rise in pressure is transferred at a reduced rate to the rear-wheel actuators. This is represented by straight line D on the graph.

Although actuators 22 are inoperative giving rise to a reduction in braking at the front wheels this is compensated for substantially by the change in the proportions of the braking effort applied by actuators 13 and 18.

This makes it possible for the size of actuators 22 and 13 to be made substantially the same, as opposed to conventional practice where actuators 22 would give a larger braking force than actuators 13. The characteristics of the master cylinder 1 are also important here since the second pressure space 10 is capable of supplying the necessary large force to actuate smaller actuators 22 in the event of a failure of the circuit connected to pressure space 9, without incurring the penalty of increased pedal effort.

It will be appreciated that since the valve assembly has connections to both brake circuits a pressure differential warning actuator may readily be incorporated in the valve assembly.

Figure 3:
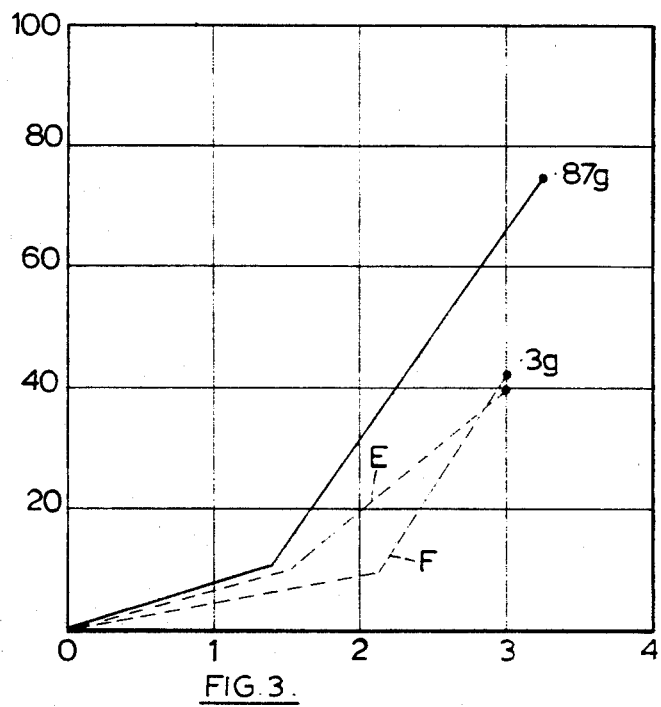
FIG. 3 is a graph showing how pedal travel and pedal effort vary.

In FIG. 3 the vertical axis represents pedal effort and the horizontal axis represents the corresponding pedal travel. FIG. 3 shows the normal case (full line) and the two failed cases E and F. It can be seen that in the failed case, 0.3g deceleration can be achieved at substantially the same pedal effort and travel, whichever system is inoperative. The dotted line F represents the pedal effort and travel required in the event of a failure of the system connected to pressure space 10, and similarly line E shows the pedal effort and travel required in the event of failure of the system connected to pressure space 9.

It will be noted that the braking system illustrated requires only one reducer valve assembly and requires a minimum number of brake lines connected to the actuators.

Figure 4:
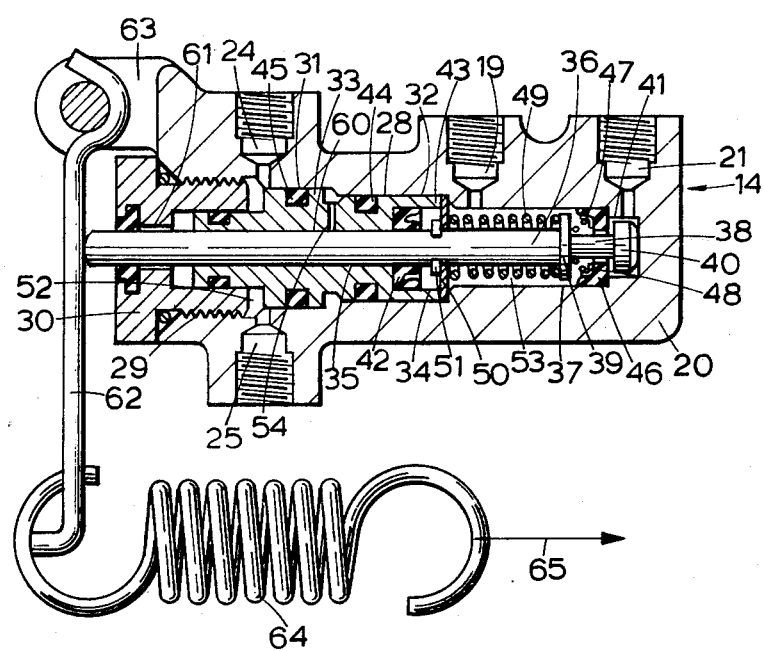
FIG. 4 shows a modified reducer valve assembly in cross-section.

FIG. 4 shows a reducer valve assembly similar to the valve assembly 14 shown in FIG. 1 but with a modification such that the assembly is load-conscious, and corresponding reference numerals have been used for corresponding parts. In the modified assembly of FIG. 4 the pressure responsive rod 36 extends out of the housing 20 through bores 60,61 in the piston 33 and the plug 30, respectively. The valve assembly has an external control spring arrangement comprising a lever member 62 pivotally mounted on an extension 63 of the housing and engaging with the external free end of the rod 36, and a control spring 64 coupled by a linkage in the direction of arrow 65 to the vehicle axle (not shown). The operation of the valve assembly is thus exactly the same as the operation of the assembly of FIG. 1, but the threshold value in the modified assembly will be the point at which the outward force on rod 36 due to pressure of fluid in chamber 53 is sufficient to overcome the load in spring 49, which is constant, and the load in spring 64, which varies in accordance with the vehicle load. Thus the threshold value will vary in accordance with vehicle load, whereas in the embodiment of FIG. 1 it is constant. The threshold value will be reduced if the front wheel braking circuit fails and will then be dependent only on the load in spring 64. Thus the higher the load on the vehicle, the higher the threshold value at which the valve head 40 engages the valve seat 46 and begins to meter the pressure increases to the rear wheel brake actuators. Thus in this embodiment the rear brake pressure is not reduced prematurely if there is a fairly high load on the rear wheels.

I claim:

1. A pressure reducer valve assembly for a vehicle braking system comprising a housing, said housing having means defining first and second inlets for connection to first and second pressure spaces of a master cylinder and means defining an outlet for connection to a rear wheel brake, said housing being provided with a bore, a valve member positioned in said bore, a valve seat of which opposite sides communicate with said first inlet and said outlet, resilient means urging said valve member away from said seat, a pressure responsive member for controlling the position of said valve member, pressure at said first inlet acting on said pressure responsive member so as to urge said valve member towards said seat, abutment means for said resilient means, and means for controlling the position of said abutment means in response to the difference in pressure at said first and second inlets, means being provided for transmitting increase of pressure in said first pressure space up to a threshold value by said reducer valve assembly directly to said outlet to said rear wheel brake, said means transmitting said increases in pressure at pressures above said threshold value at a reduced rate, and said pressure reducer valve being responsive to the difference in pressure between said first and second inlets connected to said pressure spaces and including means for reducing said threshold value upon failure of the pressure at said second inlet.

2. A pressure reducer valve assembly as claimed in claim 1, wherein said abutment member comprises a stepped piston, said housing being provided with a stepped bore in which said piston works, said piston subject at its larger end to the pressure in said second inlet and at its smaller end to the pressure in said first inlet whereby said piston is held against a step in said bore when the pressures in said inlets are substantially the same, but whereby said piston moves away from said step upon failure of the pressure in said second inlet.

3. A pressure reducer valve assembly as claimed in claim 1, wherein said resilient means comprises a caged compression spring, a cage at the end of said spring remote from the end which bears on said valve member, said cage bearing against said abutment member.

4. A pressure reducer valve assembly for a vehicle braking system comprising a housing, said housing having means defining first and second inlets for connection to first and second pressure spaces of a master cylinder and means defining an outlet for connection to a wheel brake, said housing being provided with a bore, a valve member positioned in said bore, a valve seat of which opposite sides communicate with first inlet and said outlet, resilient means urging said valve member away from said seat, a pressure responsive member for controlling the position of said valve member, pressure at said first inlet acting on said pressure responsive member so as to urge said valve member towards said seat, abutment means for said resilient means, and means for controlling the position of said abutment means in response to the difference in pressures at said first and second inlets, and a member adapted to be connected to a part of the vehicle and responsive to changes in the distribution of load on the vehicle wheels during braking, said member being arranged to change the loading of said resilient means said resilient means comprising a spring external to said valve assembly housing.

5. A pressure reducer valve assembly for a vehicle braking system comprising a housing, said housing having means defining first and second inlets for connection to first and second pressure spaces of a master cylinder and means defining an outlet for connection to a wheel brake, said housing being provided with a bore, a valve member positioned in said bore, a valve seat of which opposite sides communicate with said first inlet and said outlet, resilient means urging said valve member away from said seat, a pressure responsive member for controlling the position of said valve member, pressure at said first inlet acting on said pressure responsive member so as to urge said valve member towards said seat, abutment means for said resilient means, and means for controlling the position of said abutment means in response to the difference in pressures at said first and second inlets, wherein said pressure responsive member comprises a rod, said abutment member being provided at one end with a stepped blind bore, said rod working in said stepped bore, said rod being provided at its inner end with a reduced stem, a radial flange on said rod backing said reduced stem, and an integral valve head on said rod comprising said valve member.

6. A pressure reducer valve assembly as claimed in claim 5, wherein said resilient means comprises a caged compression spring, a cage in the form of a washer sliding on said rod, said cage abutting the inner end of said abutment member when the pressures in said inlets are substantially the same, said compression spring acting between said flange and said cage, said rod being provided with an annular groove, and a circlip received in said groove backing said cage and providing means controlling the maximum extension of said spring.

7. A vehicle hydraulic braking system incorporating a tandem master cylinder in which are defined first and second pressure spaces, first and second actuators on each of a pair of front wheels of a vehicle, and actuators on each of a pair of rear wheels of a vehicle, said first pressure space being connected directly to said first actuators on each of a pair of front wheels of the vehicle, and indirectly through said pressure reducer valve assembly to said actuators on each of a pair of rear wheels of the vehicle, and said second pressure space being connected directly to said second actuators on each of the front wheels, and a pressure reducer assembly, said pressure reducer valve assembly comprising a housing, said housing having means defining first and second inlets for connection to first and second pressure spaces of a master cylinder and means defining an outlet for connection to a wheel brake, said housing being provided with a bore, a valve member positioned in said bore, a valve seat of which opposite sides communicate with said first inlet and said outlet, resilient means urging said valve member away from said seat, a pressure responsive member for controlling the position of said valve member, pressure at said first inlet acting on said pressure responsive member so as to urge said valve member towards said seat, abutment means for said resilient means, and means for controlling the position of said abutment means in response to the difference in pressures at said first and second inlets, means being provided for transmitting increases of pressure in said first pressure space up to a threshold value by said reducer valve assembly directly to said rear wheel actuators, said means transmitting said increases in pressure at pressures above said threshold value to said rear wheel actuators at a reduced rate, and said pressure reducer valve being responsive to the difference in pressure between said first and second pressure spaces and including means for reducing said threshold value upon failure of the pressure in said second pressure space.

8. A vehicle hydraulic braking system as claimed in claim 7, wherein said means for reducing said threshold value reduces it substantially to zero on failure of the pressure in said second pressure space.

* * * * *